US005104030A

United States Patent [19]

Ranze

[11] Patent Number: 5,104,030

[45] Date of Patent: Apr. 14, 1992

[54] INLINE SPLICING OF BRITTLE SUPERCONDUCTORS

[75] Inventor: Richard A. Ranze, Scotia, N.Y.

[73] Assignee: General Electric Company, Schenectady, N.Y.

[21] Appl. No.: 627,472

[22] Filed: Dec. 14, 1990

[51] Int. Cl.[5] .............................................. B23K 31/02

[52] U.S. Cl. ................................ 228/138; 228/173.5; 228/212; 228/216; 228/44.7; 228/50; 29/599; 29/402.18; 29/423; 505/924; 505/927

[58] Field of Search ................ 228/5.7, 15.1, 18, 44.3, 228/50, 119, 44.7, 138, 173.5, 212, 213, 216; 505/924, 925, 927; 29/599, 402.18, 423, 402.07

[56] References Cited

U.S. PATENT DOCUMENTS 3,223,823 12/1965 Keller .................................. 228/50
3,365,566 1/1968 Kuder .................................. 228/50
4,103,142 7/1978 Cartwright .......................... 228/50
4,178,676 12/1979 Dustmann et al. ................ 505/924

FOREIGN PATENT DOCUMENTS 0055510 4/1980 Japan ........................................ 505/924

*Primary Examiner*—Samuel M. Heinrich
*Attorney, Agent, or Firm*—James R. McDaniel; James C. Davis, Jr.; Paul R. Webb, II

[57] ABSTRACT

An inline splicing system for brittle conductors which is comprised of a superconductor core, a superconductor coil having a length of conductor wound upon it with a terminal end, a supply spool of compatible conductor having a terminal end, both conductors being in an abutting relationship for a prescribed length, a spacer located between a portion of the abutting length and the core, and a soldering means which creates a solder along the abutting length that conforms to the circular surface of the core.

10 Claims, 1 Drawing Sheet

INLINE SPLICING OF BRITTLE SUPERCONDUCTORS

BACKGROUND OF THE INVENTION

This invention relates to an inline splicing system for brittle superconductors of the type that has a splicing assembly comprised of a protection/spacing device for protecting the superconductor coils and for providing spacing between the conductor and the coil core and a securing device for securing the conductors. Such structures of this type generally allow the brittle conductors to be spliced inline on the conductor coil without substantial removal from and damage to the coil. A protection/spacing device is placed under the terminal end of the conductor which had previously been wound upon a conductor coil. Another terminal end of a second compatible conductor previously wound on a supply spool is placed adjacent to and abutting the first conductor, whereupon, the two conductors are secured and soldered. This invention relates to certain unique inline splicing systems and the securing and soldering means in association therewith.

It is known, in superconductor splicing systems to make use of a system which includes a conductor wound about a superconductor coil, a supply spool of compatible conductor and a soldering device. In each of these cases, a solder connection was made between the conductors from the coil and the supply spool while the conductor is off-line of the coil, with the hope of adequately soldering and substantially securing the two conductors together. Not all have been successful in this regard because the conductors are soldered in an off-line substantially flat condition. When the spliced conductor is wound onto the coil, the solder joint will not adequately bend around and conform to the circumferential area of the O-ring tensioner or the coil core which results in the conductors suffering mechanical fatigue and breaking because the conductors are inherently structurally weaker than the solder joints. A more advantageous splicing system, then, would be presented if the conductors were secured and soldered in a geometrical configuration that substantially conformed to the configuration of the O-ring tensioner and the coil core.

It is apparent from the above that there exists a need in the art for an inline splicing system which is easy to use through uniqueness of structure, and which at least equals the safety characteristics of the known splicing systems but, which at the same time provides splicing configurations that substantially conform to the geometries of the O-ring tensioner and the coil core rather than producing a substantially flat splice configuration. It is a purpose of this invention to fulfill this and other needs in the art in a manner more apparent to the skilled artisan once given the following disclosure.

SUMMARY OF THE INVENTION

Generally speaking, this invention fulfills these needs by providing an inline splicing system which substantially creates a splice between at least two brittle conductors comprising a conductor coil core with a curved configuration having a brittle conductor material wound thereon with a first terminal end, a supply spool of a substantially compatible brittle conductor material wound thereon having a second terminal end, a protection and spacer means located substantially between said material wound on said coil and said coil and adjacent said first terminal end, said second terminal end located away from said first end and substantially abutting said first conductor to create a predetermined length between said terminal ends, and a securing means for substantially securing said conductors in order to substantially complete said splice between said terminal ends and along said conductors so that said splice substantially conforms to said coil core configuration.

In certain preferred embodiments, the protection/spacer means is substantially large enough to allow both conductors to be soldered at several points along their adjacent lengths without moving the protection/spacer means.

In another further preferred embodiment, the conductors are spliced inline along the curved surface of the superconductor coil core to provide a substantially curved splice so as to substantially eliminate the possibility of the conductors breaking or suffering mechanical fatigue as they are wound upon the coil after the splice is completed.

In particularly preferred embodiments, the inline splicing system of this invention consists essentially of a one piece protection/spacing device which is initially located under the first terminal end of the conductor material wound around the superconductor coil, a second terminal end of a substantially compatible conductor material previously wound around a supply spool, the second terminal end being located substantially adjacent and abutting a position along the first conductor length previously wound around the coil and located away from the first end, a securing means, preferably an adhesive tape, for securing the conductors in the abutting relationship, and a soldering means, preferably a pencil-tip soldering iron and indium solder, for completing a splice between the terminal ends and along the abutting conductors.

The preferred inline splicing system for conductors, according to this invention, offers the following advantages: good durability, good economy, good stability, good joint integrity, ease of operation, and excellent safety characteristics. In fact, in many of the preferred embodiments, these factors of joint integrity and ease of operation are optimized to an extent considerably higher than heretofore achieved in prior, known splicing systems.

BRIEF DESCRIPTION OF THE INVENTION

DETAILED DESCRIPTION OF THE INVENTION

Figure 1:
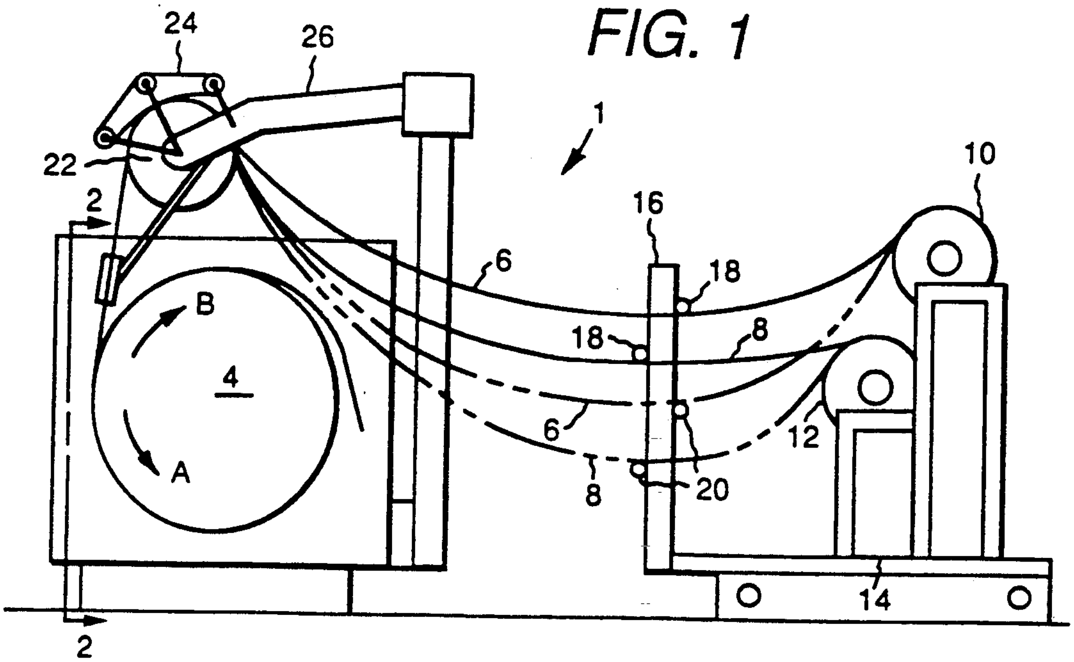
FIG. 1 is a side, plan view of a superconductor coil winding system, according to the present invention.

With reference first to FIG. 1, there is illustrated a well-known, conventional brittle superconductor coil winding system 1. Upon a conventional core 4, brittle conductor material 6, preferably constructed of Niobium-Tin ($Nb_3Sn$) is wound in direction of arrow A along with insulator 8, which is preferably copper, in a conventional side-by-side relationship. It is well known that the Niobium-Tin conductor 6 must be laid down on the superconductor core 4 in a parallel fashion with insulator 8 in order to provide the needed insulation for the Niobium-Tin conductor.

As conductor 6 and insulator 8 unwind from their respective, conventional supply spools 10, 12, the amount of unwinding from these spools is detected by conventional, well-known sensors 18, 20 which are located on vertical guide 16. Sensors 18, 20 detect if too much conductor 6 or insulator 8 are unwound from spools 10, 12, respectively, and signal the drive mechanism (not shown) for spools 10, 12 that an appropriate well-known braking measure for spools 10, 12 should take place.

Figure 2:
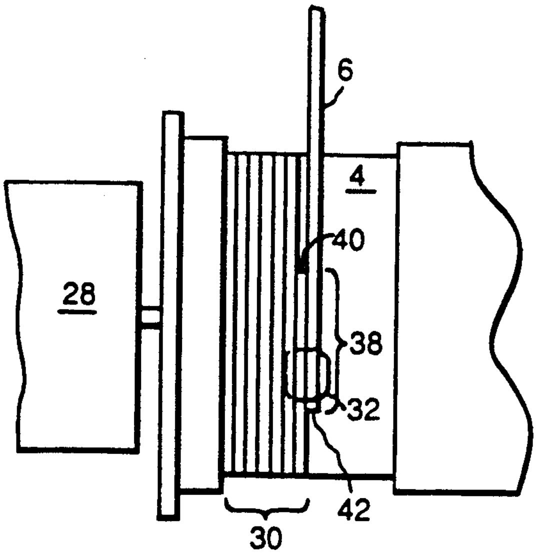
FIG. 2 is a front view of FIG. 1, taken along line 2—2, according to the present invention.

In order to provide adequate tension on conductor 6 and insulator 8, a conventional, dual groove O-ring 22 and conventional dual band O-ring tensioner 24 are employed. In particular, as conductor 6 and insulator 8 contact O-ring 22, conductor 6 and insulator 8 ride in conventional, circumferential grooves (not shown) in O-ring 22, As conductor 6 and insulator 8 contact tensioner 24, tensioner 24 causes frictional drag between conductor 6, insulator 8 and O-ring 22. This drag, while not harmful to the structure of conductor 6 or insulator 8, causes a pulling force opposite to the direction of winding (Arrow A) on core 4 and conventional winding motor 28 (FIG. 2) which substantially reduces the slack in conductor 6 and insulator 8 as the 6 and insulator 8 are wrapped around core 4 to form coils 30 (FIG. 2).

Conductor 6 and insulator 8 are wound around core 4 in the direction of arrow A to form coils 30 until substantially the entire circumferential area of core 4 is surrounded.

Sometimes during the winding of the coils 30, it is discovered that conductor 6 was damaged during manufacturing due to the well known tin burst effect or some other deleterious cause or the conductor 6 may not be required to be a continuous length. In this instance, a splice 38 (FIG. 3) must be created between the terminal end 40 of coil 30 and the terminal end 42 of conductor 6 along the length where conductor 6 and coil 30 abut.

After a failure is noticed in conductor 6 or conductor 6 is cut, especially if conductor 6 has experienced failure, approximately 50 feet of conductor 6 are removed from each side of the damage in order to ensure that all the damaged length has been removed. This technique is well known and conventional.

Figure 3:
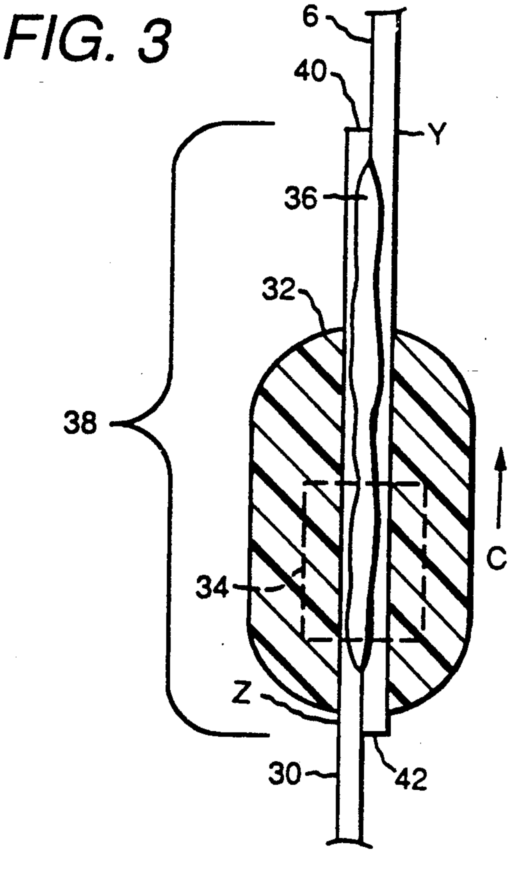
FIG. 3 is an exploded view of FIG. 2 of the bracketed area 38.

When the required amount of conductor 6 has been removed, the coil 30 must be spliced to the conductor 6. Approximately 60" of coil 30 are unwound in the direction of arrow B from core 4. This is shown in FIG. 3 as the length of coil 30 between terminal end 40 and point Z. Also, approximately 60" of conductor 6 are unwound from spool 10. This is shown in FIG. 3 as the length of conductor 6 between terminal end 42 and point Y. These two 60" sections will ultimately be spliced together along their lengths to form a splice 38 approximately 60" long. This technique of selecting 60" as the required length is also well known. After the lengths are measured out, the splicing begins.

With respect to FIGS. 2 and 3, spacer/protector 32 is positioned under the last winding of coil 30, with the lower edge of spacer 30 located approximately at point Z. Spacer 32 is preferably constructed of MYLAR® polyester film or other suitable materials and can be of any suitable dimensions with the preferred dimensions being 0.010" (thickness)×1" (width)×8" (length). It is preferred that the edges of spacer 32 be rounded so that the edges will not substantially scrape against conductor 6 or coil 30 and adversely alter the structural or electrical properties of conductor 6 or coil 30. Spacer 32 is also used to protect the core and coil from any adverse affects of the conventional fluxing, soldering or washing process.

After spacer 32 is placed under the last winding coil 30, the terminal end 42 of conductor 6 is positioned in a substantially abutting relationship with point Z of coil 30. A piece 34 of conventional adhesive tape, preferably containing KIMWIPE® disposable wipes is placed over and adjacent to the contact area between terminal end 42 and point Z.

The area between terminal end 42 and conductor 6 to be soldered, which is preferably 3"-4", is then moistened with a flux material, preferably conventional ruby flux, by a moistened, conventional cotton-tipped applicator (not shown).

After the flux is applied, a conventional soldering iron, preferably a pencil-tip soldering ion, is used to apply solder, preferably 99.99% Indium solder, to create a solder joint 36 over the area that was previously fluxed. The preferred solder joint 36 is approximately 3"-4" in length and forms a puddle of solder between coil 30 and conductor 6 such that some of the solder should seep through to beneath the abutting area between the coil 30 and conductor 6 to create a solder joint 36 on both sides of abutting area between coil 30 and conductor 6.

When the solder joint 36 is completed, the joint 36 is finally washed by a conventional flux wash (not shown), preferably a flux wash comprising water and isopropyl alcohol.

The tape 34 is removed because the first solder joint 36 will provide an adequate joint to keep the last winding of coil 30 and conductor 6 in an abutting, substantially fixed relationship. Another 3"-4" solder joint 36 is then prepared above the first solder joint according to the above-identified technique.

After the second solder joint 36 is completed, spacer 32 is moved in direction of arrow C so that the lower end of spacer 32 is located adjacent the upper end of the last solder joint 36. Two more solder joints 36 are created and spacer 32 is again moved in direction C the same distance it was previously moved. This movement of spacer 32 and creation of solder joints 36 takes place until substantially the entire 60" length of the abutting length between the last winding of coil 30 and conductor 6 has been secured by splice 38.

It is to be understood that while the length of spacer 32 preferably is 8", spacer 32 can be of any acceptable length so long as spacer 32 provides adequate protection for the core and support, collectively, for coil 30, conductor 6, adhesive 34 and solder joint 36. For example, if the operator did not want to move the spacer 32 so often, than the spacer 32 could be made longer so that more 3"-4" solder joints could be completed before spacer 32 had to be moved.

Also, it is to be understood that the operator may want to make larger solder joints 36 than the preferred 3"-4" solder joints. While the operator may still have to move the spacer 32 after completing two solder joints 36, as was the preferred practice, the operator will move the spacer 32 a lesser number of times, overall, in order to complete the splice 38.

After splice 38 has been completed and checked, preferably visually, to see that the splice 38 is uniform and substantially contacts the entire 60" length of abutting length between the last winding of coil 30 and conductor 6, then the operator can continue winding conductor 6 and insulator 8 around coil 30 in the direction of arrow A.

While conductor 6 has been the main focus of this invention, it is to be understood that insulator 8, is placed in an abutting relationship to splice 38 of conductor 6 and coil 30 as conductor 6 and coil 30 are spliced together.

Once given the above disclosure, many other features, modifications and improvements are, therefore, considered to be a part of this invention, the scope of which is to be determined by the following claims.

What is claimed is:

1. An incline splicing system which substantially creates a splice between at least two brittle superconductors, comprising a conductor coil core with a curved configuration having a brittle superconductor material including a conductor material and an insulator material wound thereon with a first terminal end, a supply spool of a substantially compatible brittle superconductor material wound thereon having a second terminal end, a protection and spacer means located substantially between said insulator material wound on said coil and said coil and adjacent said first terminal end, said second terminal end located away from said first end and substantially abutting said first conductor to create a predetermined length between said terminal ends, and a securing means for substantially securing said conductors in order to substantially complete said splice between said terminal ends and along said conductors so that said splice substantially conforms to said coil core configuration.

2. The system according to claim 1, wherein said brittle conductor is further comprised of niobium-tin ($NB_3Sn$).

3. The system according to claim 1 wherein said spacer is further comprised of polyester film.

4. The system according to claim 1 wherein said securing means is further comprised of an adhesive means and a solder means.

5. The system according to claim 4 wherein said adhesive means is adhesive tape.

6. The system according to claim 4 wherein said solder means is indium solder and a pencil-tip soldering iron.

7. A method for inline splicing of brittle conductor material on a conductor coil having a core of a predetermined geometrical configuration with a first conductor wound thereon having a first terminal end, a supply spool of a substantially compatible brittle second conductor wound thereon having a second terminal end, which is comprised of the steps of:

unwinding a predetermined first amount of said first conductor from said coil;

unwinding a second amount of said second conductor from said spool which is substantially equal to said first amount such that said second amount is located along said second conductor at a point beginning with said second terminal end and extending away from said second terminal end along the length of said second conductor;

placing a spacer between said first conductor and said coil at a first location away from said first terminal end of said first conductor;

placing said second terminal end of said second conductor in a substantially abutting relationship with said first conductor adjacent to said first location of said spacer; and securing said first and second conductors by an electrically conductive means to form a splice so that said splice substantially conforms to said configuration of said coil core.

8. The method according to claim 7 wherein said spacer is moved along said predetermined length until a splice is completed substantially along said predetermined amount.

9. The method according to claim 7 wherein said securing step is further comprised of the steps of:

adhering said second terminal end of said second conductor and first location on said first conductor away from said first terminal end to said spacer; and soldering said terminal end of said second conductor to said location away from said first terminal end of said first conductor to form a solder joint.

10. The method according to claim 7 wherein said spacer is moved to another position along said abutting relationship; and soldering said first conductor to said second conductor until a substantially complete splice is constructed.

* * * * *